Figure 1:
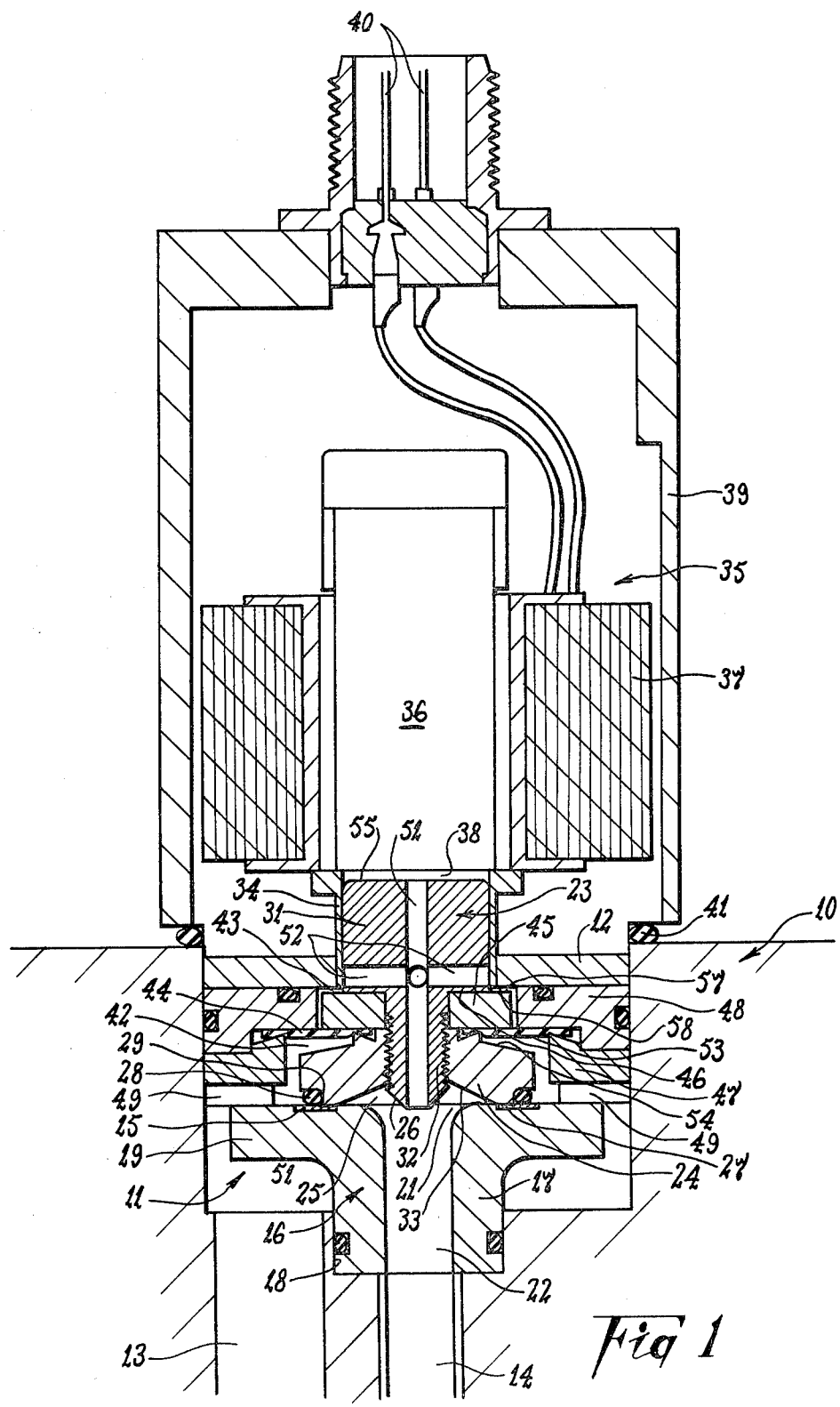

United States Patent [19]

Stone

[11] 4,210,311

[45] Jul. 1, 1980

[54] VALVES

[75] Inventor: Alan M. Stone, Greensborough, Australia

[73] Assignee: Sphere Investments Limited, Nassau, The Bahamas

[21] Appl. No.: 847,940

[22] Filed: Nov. 2, 1977

[30] Foreign Application Priority Data

Nov. 11, 1976 [AU] Australia .................................. 8090

[51] Int. Cl.² ...................... F16K 31/06; F16K 25/00
[52] U.S. Cl. .................................. 251/129; 251/282; 251/DIG. 1
[58] Field of Search .......... 251/282, 24, 129, DIG. 1; 137/509

[56] References Cited

U.S. PATENT DOCUMENTS

| | | | |
|---|---|---|---|
| 2,608,376 | 8/1952 | Adams | 251/DIG. 1 |
| 2,826,215 | 3/1958 | Wolfslau et al. | 251/282 X |
| 2,931,616 | 4/1960 | White et al. | 251/282 X |
| 3,202,178 | 8/1965 | Wolfe | 251/DIG. 1 |
| 3,214,134 | 10/1965 | Noares | 251/282 |
| 3,534,770 | 10/1970 | Kowalski | 251/282 X |
| 3,627,257 | 12/1971 | Stampfli | 251/282 X |
| 3,873,063 | 3/1975 | Illing | 251/282 |
| 3,985,333 | 10/1976 | Paulsen | 251/282 X |

*Primary Examiner*—Arnold Rosenthal
*Attorney, Agent, or Firm*—Frost & Jacobs

[57] ABSTRACT

A rapid response valve particularly suited for controlling a jet of fluid of variable duration, the valve having a chamber with a valve seat surrounding a valve orifice, a valve member within the chamber movable toward and away from the valve seat, the chamber having an inlet compartment and an outlet compartment, means being provided to effectively balance the fluid pressure on opposite sides of the valve element when in the closed position so that the valve may be rapidly moved to the open position when actuated, means also being provided to create a venturi effect to assist in rapidly returning the valve to its closed position.

11 Claims, 2 Drawing Figures

VALVES

This invention relates to valves of the kind used in controlling a jet of fluid of variable duration. Such valves are commonly used in ore sorting and it will be convenient to hereinafter describe the invention in relation to that example application.

During the process of beneficiating ores it is often desired to sort the ore into preselected categories. Generally, this sorting is achieved by conveying ore rocks past the end of a nozzle or nozzles from which fluid jets of short duration are delivered to remove selected ore rocks. It has been found, however, that valves commonly available for controlling the fluid delivered to the nozzle do not respond sufficiently rapidly to command signals to allow the removal of small rocks individually from a close array of moving rocks. In that regard, the ore is conveyed past the nozzle at a relatively fast rate and there is allowed very little time to remove the selected rocks so that delay in valve response can cause operational difficulties.

It is an object of the present invention to provide a valve which has a rapid response facility incorporated therein.

It is another object to provide a valve which is particularly suitable for use in ore sorting processes where fluid jets of short duration are required to be delivered to remove selected ore rocks from a close array of moving rocks.

It is a further object to provide a relatively inexpensive yet effective control valve for ore sorting purposes.

According to the present invention there is provided a valve including: a housing having a valve chamber therein; a valve seat within said chamber and surrounding a valve orifice; a valve member mounted within said chamber for movement towards and away from said valve seat and dividing said chamber into an inlet compartment and an outlet compartment; an inlet passage communicating with said inlet compartment; an outlet passage communicating with said outlet compartment and being connectable with said inlet compartment through said orifice; said valve member being engagable with said valve seat in a closed condition of said valve to block communication between said inlet compartment and said outlet passage through said orifice; actuating means are provided to move the valve member from closed to open position and to hold the valve member in the open position; the valve member has opposed surfaces exposed to the pressure of the fluid within the inlet passage, one of the opposed surfaces being slightly greater in area than the other of the opposed surfaces so that the influence of the inlet pressure on the valve member is such that movement is substantially balanced but for a small biasing force urging the valve member toward the valve seat; a part of the surface of the valve member facing the valve seat being arranged relative to part of the opposed surface of the valve seat to provide an annular passageway between said surfaces such that, when the valve is open, fluid flowing through the annular passage from the inlet compartment to the outlet passage creates a low pressure region between the said surfaces, whereby movement of the valve member toward the valve seat is facilitated when the actuating means releases the valve member for closing movement.

In a preferred construction, the aforementioned valve member surface at the annular passage has an annular recess formed therein, which is contoured relative to the opposed valve seat surface so as to create a passage which progressively increases from a minimum size adjacent the valve seat to a maximum size spaced radially inwards of the seat. As a result, a venturi effect to provide a low pressure region is produced when the valve is opened and high pressure fluid passes between the valve member and valve seat, through the aforementioned passage, and into the outlet passage. The recess is preferably substantially "V" shaped in cross-section with its radially innermost face being arranged to deflect fluid to flow generally in the axial direction of the valve orifice.

It is further preferred that the valve member is substantially pressure balanced on the outlet side, when the valve is closed, so that fluid pressure in the outlet passage has substantially no influence on the valve member movement. In particular, that pressure regardless of its magnitude, does not significantly hinder opening movement of the valve, and this is achieved by appropriate selection of surface areas which are exposed to the pressure in the outlet passage when the valve is closed.

Electromagnetic actuation is particularly satisfactory for a valve of the foregoing, because of the pressure balancing, and also because in ore sorting applications the valve member need only travel through a very short distance. In such an arrangement the electromagnetic actuator may be arranged, so that on energization, it moves the valve member away from the valve seat against the small fluid pressure bias to thereby open the valve. When the actuator is de-energised, the combined affect of the aforementioned low pressure region and the small fluid pressure bias functions to move the valve member toward the valve seat to close the valve.

The valve member and housing may be provided with inter-engagable abutment shoulders, and maximum movement of the valve member away from the seat is determined by interengagement of those shoulders. In that way separation of the valve member and valve seat can be limited so as to maintain the effectiveness of the low pressure region as a valve closing influence. The separation gap is preferably, relatively narrow at maximum opening of the valve, and is only slightly smaller than the clearance space which exists between the core of the electromagnetic actuator and the adjacent end of the valve member when the valve is closed. That short separation gap contributes to rapid response of the valve, as does the relationship between that gap and the clearance space.

In one particular form of the valve member, it includes an annular flexible diaphragm which is secured around the valve member and has its outer peripheral portion secured to the housing. That arrangement is such that the diaphragm flexes to permit the valve member movement and forms a dividing wall between the inlet and outlet compartments.

The essential features of the invention, and further optional features, are described in detail in the following detailed specification which refer to the accompanying drawings. The drawings however, are merely illustrative of how the invention might be put into effect, so that the specific form and arrangement of the features (whether they be essential or optional features) shown is not to be understood as limiting on the invention.

Figure 2:
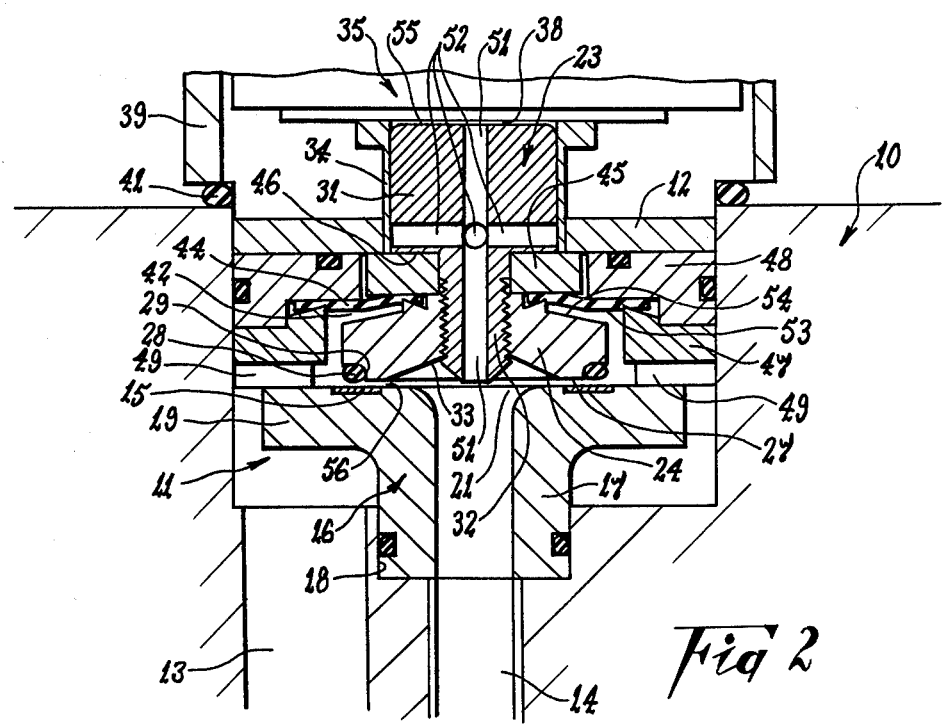

In the drawings:

FIG. 1 is a semi-diagrammatic cross-sectional view of a valve according to one embodiment of the invention, shown in the closed position; and FIG. 2 is a view similar to FIG. 1, but showing the valve in an open condition.

The valve shown in the drawings includes a housing 10 having a valve chamber 11 formed therein. The chamber 11 is preferably cylindrical and opens through one side of the housing 10 for a reason hereinafter made clear. A removable cover plate 12 is located within the open end of the chamber 11 so that it is possible to gain access to the valve components within the chamber 11. The housing 10 is also provided with an inlet passage 13 and an outlet passage 14 for delivery of fluid to and from the valve chamber 11 respectively.

A valve seat 15 is provided within the housing 10, and in the preferred construction shown, it is formed on a seat member 16 which is removably mounted within the housing 10. That seat member 16 comprises a tubular section 17, which is removably mounted in a counterbored section 18 of the outlet passage 14, and a laterally projecting annular flange 19 which is disposed within the valve chamber 11. The valve seat 15 is provided on the end surface of the flange 19 and surrounds the valve orifice 21 which is defined by one end of a bore 22 extending axially through the member 16. The bore 22 in effect forms a continuation of the outlet passage 14. The actual valve seat 15 is preferably formed by an annular insert of suitable material attached to the outer face of the flange 19 in coaxial relationship with the valve orifice 21. Quite clearly, other valve seat constructions may be employed, but a removable construction is preferred for maintenance purposes.

The valve further includes a valve member 23 which is movably mounted within the valve chamber 11 so as to be co-operable with the valve seat 15 to control fluid flow between the fluid inlet and outlet passages 13 and 14, respectively. The valve member 23 is substantially cylindrical, is arranged co-axially of the valve seat 15, and is mounted for axial movement towards and away from the valve seat 15. In the preferred construction shown, the valve member 23 includes a closure member 24 which is in the form of a disc and has an annular recess 25 formed in its surface which is exposed to the outlet passage 14. As shown, the recess 25 is substantially V-shaped in cross-section, and the radially innermost face 26 of the recess 25 is arranged to deflect fluid to flow into the orifice 21, generally in the axial direction of the bore 22. A substantially flat annular surface 27 of the closure member, which surrounds the recess 25, is arranged for co-operable engagement with the valve seat 15.

In order to achieve efficient sealing engagement with the valve seat 15, the particular valve member shown is provided with a resilient "O" ring 28 at the outer periphery of the member 24. That ring 28 is retained in a circumferential groove 29 in such a way that it is engagable with the valve seat 15 in the closed condition of the valve (as shown in FIG. 1), and in that condition the ring 28 is exposed to fluid pressure from the inlet passage 13 so as to be urged against the valve seat 15 by that pressure.

The valve member 23 as shown, also includes a stem member 31 having a section 32 of reduced diameter to which the closure member 24 is removably connected by threaded engagement. The terminal end of the section 32 projects beyond the recess surface 33 of the closure member and is tapered so as to form the inner surface 26 of the recess 25. The valve stem 31 is slidably mounted in a guide sleeve 34 having one end secured to the cover plate 12.

Actuation of the valve may be achieved in many different ways, but in the preferred construction illustrated an electromagnetic actuator 35 is utilized. The electromagnetic actuator 35 includes a magnetizable core 36 surrounded by a coil 37 adapted to be energized by connection through leads 40 to a source of electrical energy (not shown). The core 36 is mounted substantially co-axial with the valve stem 31, and abuts or lies close to an adjacent end of the sleeve 34 so that a clearance space 38 exists between the core 36 and stem 31. In the construction shown, the electromagnetic actuator 35 constitutes the sole means for moving the valve member 23 into the valve open position (FIG. 2), and for that purpose at least a portion of the valve stem 31 is composed of material suited for magnetic attraction.

A protective cover 39 may be provided over the electromagnetic actuator 35, and that may comprise a sleeve which is closed at one end and is attached to the housing 10, at its other end so as to enclose both the actuator 35 and the guide sleeve 34. In order to seal against ingress of dirt, grease, etc., a resilient "O"-ring seal 41 may be provided between the cover 39 and the valve housing 10.

To achieve the principal object of the present invention, a rapid response facility is incorporated into the valve construction particularly described. As previously explained, that facility is achieved, at least partially, by a degree of pressure balancing across the movable valve member 23, particularly in the valve closed position. Additionally, a rapid closing response is achieved, at least in part, by creating a venturi effect at the face of the valve member 23 adjacent the valve seat 15, when the valve is open.

The valve member 23 divides the valve chamber 11 into two compartments, which will be referred to as inlet and outlet pressure balance compartments 42 and 43, respectively. The inlet compartment 42 communicates with the inlet passage 13, and the outlet compartment 43 communicates with the outlet passage 14 and is connectable with the inlet compartment 42 through the valve orifice 21. In the preferred construction shown, the valve member 23 includes an annular flexible diaphragm 44 which forms at least part of the dividing wall between the compartments 42 and 43. The inner peripheral portion of the diaphragm 44 is secured to the body of the valve member 23 in the arrangement shown, by being clamped between the closure member 24 and a backing ring 45 which abuts against a shoulder 46 of the valve stem 31. That arrangement permits relatively convenient manufacture of the valve member components, and also permits convenient assembly of those components.

The outer peripheral portion of the diaphragm 44 may be secured to the housing 10 in any appropriate manner so as to be held against movement with the valve member 23. In the construction shown, that outer portion is clamped between a pair of rings 47 and 48 which are in turn firmly interposed between the cover plate 12 and the valve seat member 19. The clamp ring 48 sealingly engages both the surrounding surface of the chamber 11 and the cover plate 12 so as to guard against fluid leakage between the inlet and the outlet compartments 42 and 43. The ring 47 is provided with a series of radial passages 49 to permit the inlet passage 13 to communicate with the inlet compartment 42, but that could be achieved in other ways.

Fluid communication between the outlet passage 14 and the outlet compartment 43, is effected in the construction shown, through an axial passage 51 in the valve member 23 and radial passages 52 which intersect with the axial passage 51. Thus, the outlet compartment 43 and the outlet passage 14 are in continual communication through the valve member 23. The passage 51 continues completely through the valve member 23 so that the outlet passage 14 is also in continuous communication with the clearance space 38.

It will be understood from the foregoing that when the valve is closed, pressure of fluid in the inlet passage 13 acts on the diaphragm surface 53 which is exposed to the inlet compartment 42, and consequently exerts an opening influence on the valve member 23. That influence is counterbalanced in part by the pressure also acting against an opposed surface 54 of the closure member 24. The effective areas of the surfaces 53 and 54 are related so that the influence of inlet pressure on movement of the valve member 23, is substantially balanced when the valve is closed. The effective area of the surface 53 is slightly smaller than that of surface 54, however, so there is some degree of pressure bias urging the valve member 23 towards the valve seat 15 such as to close the valve. The "effective" area of either surface is that part of the total exposed area against which the pressure can act to influence movement of the valve member 23. In the case of the diaphragm 44, the effective area of surface 53 is the exposed part located inwardly of clamp ring 48.

Resistance to opening of the valve is further reduced by having parts of the valve member 23 exposed to pressure of fluid within the outlet passage 14 arranged so that the outlet pressure has substantially no influence on valve member movement. That is, the influence of the outlet pressure acting on the valve member surface 26 and 33, is substantially counterbalanced by that same pressure acting against the surfaces of the diaphragm 44 and backing ring 45 which are exposed to the outlet compartment 43, and the terminal surface 55 of the valve stem 31 which is exposed to the clearance space 38. That is, the respective areas of the aforementioned surfaces are related such that the valve member 23 is at least near pressure balanced on the outlet side when the valve is closed. It will therefore be appreciated, that in the event of increase in back pressure within the outlet passage 14, the pressure balance of the valve member 23 is not substantially affected because of the aforementioned surface area relationship.

In order to achieve the desired venturi effect between the valve member 23 and the valve seat member 16, the maximum separation gap 56 (FIG. 2) between the member 23 and valve seat 15 is relatively narrow. That gap 56 is determined by engagement of opposed abutment surfaces 57 and 58 of the backing ring 45 and cover plate 12, respectively. In that regard, the depth of the clearance space 38 as existing in the valve closed condition, is larger than the maximum separation gap 56 so as to permit full movement of the valve member 23. It is preferred however, that the space 38 is only slightly larger than gap 56 so that the electromagnetic actuator 35 is able to apply maximum influence on the valve member 23 when energized.

The operation of the valve described is as follows. Initially, with the valve in the closed position, as shown in FIG. 1, the sealing ring 28 of the valve closure member 24 is urged by the aforementioned pressure bias, into sealing contact with the valve seat 15. It is significant that springs or other mechanical components are not employed in maintaining the valve in the closed position. On energization of the electromagnetic actuator 35, the valve stem 31 is attracted towards the electromagnet core 36, thereby opening the valve. Because of the relatively low pressure differential tending to close the valve, the resistance to opening movement of the closure member 23 is small, so that rapid opening occurs, and the delay between energization and opening movement is insignificant because of the closeness of the core 36 and valve stem 31.

During opening movement of the valve, the fluid in the outlet compartment 43 and clearance space 38 is exhausted to the outlet passage 14 through creation of a venturi effect at the valve orifice 21. That is, as inlet fluid escapes through the valve separation gap 56 (FIG. 2), it is deflected by the tapered surface 26 of the valve stem section 32 so that a pressure reduction is created within the stem passage 51. A venturi effect also occurs in the recess 25 of closure member 24, thereby tending to draw that member into a valve closed position, but that closing movement is resisted by the electromagnetic actuator 35.

When it is desired to close the valve, the electromagnet is de-energised and the valve member 23 is moved rapidly toward the valve seat 15 by the combined effect of the low pressure region in recess 25 and the pressure bias existing between surfaces 53 and 54.

It will be appreciated from the foregoing that a valve according to the invention has an advantage of rapid valve member response when compared to prior valves. It follows that the valve allows more accurate control of fluid flow than prior valves, and is therefore particularly suitable for use in ore sorting processes. In that particular application high pressure fluid jets of short duration are generally required, so that the electromagnetic actuator is desirably energized by a pulse of correspondingly short duration. The rapid response of the present valve allows the jet duration to be accurately controlled by pulse regulation, and also allows accurate control over the time of initiation of the jet, which can be a very important advantage in ore sorting.

A further advantage of the valve of the invention is that the rapid response facility is achieved by a relatively simple construction. As such the costs of manufacture and maintenance are minimized.

Finally, it is to be understood that various other modifications and/or alterations may be made without departing from the spirit of the present invention as defined by the appended claims.

I claim:

1. A valve including:
   a housing having a valve chamber therein;
   an annular valve seat within the chamber and surrounding a valve orifice;
   a valve member mounted within said chamber for movement towards and away from said valve seat;
   a flexible annular diaphragm connected between the valve member and the housing within the valve chamber so as to divide that chamber into a first compartment containing said valve orfice and a second compartment remote from said valve orifice;
   a fluid inlet passage connecting with said first compartment;
   a fluid outlet passage capable of communication with said first compartment through said orifice when the valve is in an open condition;
   said valve member being engagable with said valve seat in a closed condition of the valve to block said communication between said first compartment and the outlet passage through said orifice;

actuating means for moving said valve member from closed to open position and for holding said valve member in open position;

said valve member and the diaphragm having opposed surfaces exposed to the pressure of fluid within said inlet passage and said first compartment such that the influence of inlet pressure on said surface of the diaphragm produces a force on the valve member in a direction away from the valve seat and the influence of inlet pressure on said surface of the valve member produces a force on the valve member in a direction toward the valve seat, the effective area of said diaphragm surface being slightly less than the effective area of said valve member surface whereby said forces are substantially counterbalanced but for a small biasing force urging the valve member toward said valve seat;

said valve member and said valve seat having facing surfaces, the facing surface of said valve member having an annular recess formed therein which slopes conically away from the facing surface of said valve seat in the radially inward direction to provide therebetween an annular passage which diverges radially inwardly of the valve seat such that, when the valve is open, fluid flowing from said first compartment to said outlet passage between said facing surfaces creates a low pressure region between those surfaces, whereby movement of said valve member toward the valve seat is facilitated during closing of the valve; and passage means allowing communication between said outlet passage and said second compartment, said valve member and the flexible diaphragm having surfaces within the second compartment exposed to outlet pressure, the effective areas of said last named surfaces being such that the influence of outlet pressure thereon counterbalances the influence of the outlet pressure on the valve member at the valve seat.

2. a valve according to claim 1, wherein said annular recess in said valve member is substantially "V" shaped in cross-section, and the radially innermost face of said recess is arranged to deflect fluid to flow generally in the axial direction of said orifice.

3. A valve according to claim 1, wherein the valve member actuating means comprises electromagnetic means which is operative, when energized, to move valve member away from said valve seat against said small biasing force, whereby to open said valve and retain it in an open position.

4. A valve according to claim 3, wherein the combined affect of said low pressure region and said small biasing force cause said valve member to move toward said valve seat and thereby close said valve when said electromagnetic means is de-energized.

5. A valve according to claim 3, wherein said valve member and housing are provided with inter-engagable abutment shoulders, and movement of said valve member away from said valve seat is limited by interengagement of said abutment shoulders.

6. A valve according to claim 5, wherein, when said abutment shoulders engage, a separation gap exists between said valve seat and the engagable surface of said valve member, said separation gap is relatively narrow; and when said valve member and valve seat engage, a clearance space exists between the core of said electromagnetic means and an adjacent surface of said valve member, and said clearance space is only slightly larger than said separation gap.

7. A valve according to claim 1, wherein said valve body includes a closure member movable toward and away from said valve seat to control fluid communication between said inlet compartment and said outlet passage through said orifice, and a stem member connected to said closure member and being responsive to said valve member actuating means to cause movement of said closure member away from said valve seat against said fluid pressure bias.

8. A valve according to claim 8, wherein an inner peripheral portion of said diaphragm is clamped between said closure member and an abutment surface of said stem member to secure said inner peripheral portion for movement with said valve body.

9. A valve according to claim 1, wherein the outer peripheral portion of said diaphragm is clamped between a pair of clamp rings mounted within said valve chamber, and part of said inlet passage is formed in one of said clamp rings.

10. A valve according to claim 1 wherein said valve member is slidably mounted in a guide sleeve forming part of said housing, a clearance space is provided at one end of said sleeve between said valve member and said valve member actuating means, said second compartment is located adjacent the opposite end of said sleeve and external thereof, and said passage means is formed through said valve member and provides said communication between said outlet passage and said second compartment and also provides communication between said outlet passage and said clearance space.

11. A valve according to claim 1, wherein said valve member has a closure member arranged for engagement with said valve seat, said closure member having an annular seat engaging surface and a circumferential groove extending around the outer periphery of said annular surface, a resilient sealing ring mounted within said groove for engagement with said valve seat, said groove being arranged so that said sealing ring is exposed to fluid pressure in said first compartment when said valve is closed and is thereby urged against said valve seat.

* * * * *